United States Patent
Ishibashi et al.

(10) Patent No.: US 7,324,232 B2
(45) Date of Patent: Jan. 29, 2008

(54) PRINTER, PRINTER SETTING METHOD AND CORRESPONDING PROGRAM, AND CARTRIDGE

(75) Inventors: Osamu Ishibashi, Nagano-ken (JP); Kazuhiro Ichikawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 995 days.

(21) Appl. No.: 10/443,144

(22) Filed: May 22, 2003

(65) Prior Publication Data

US 2004/0070774 A1    Apr. 15, 2004

(30) Foreign Application Priority Data

May 22, 2002  (JP)  ............................. 2002-147309
May 15, 2003  (JP)  ............................. 2003-137391

(51) Int. Cl.
*G06K 15/02*    (2006.01)
(52) U.S. Cl. ..................................... 358/1.15; 358/1.16
(58) Field of Classification Search ................ 358/406, 358/1.15, 1.14, 1.13, 1.16; 399/262
See application file for complete search history.

(56) References Cited

U.S. PATENT DOCUMENTS 7,044,574 B2 *    5/2006    Croley et al. ................. 347/19

FOREIGN PATENT DOCUMENTS

EP            1 202 161 A1    5/2002
JP            2001-034113     9/2001

* cited by examiner

*Primary Examiner*—Kimberly A. Williams
(74) *Attorney, Agent, or Firm*—Sughrue Mion, PLLC (57) ABSTRACT

A color laser printer 10 compares a pervious printer, which a toner cartridge 40 has been attached to immediately before attachment to the current printer, with the current printer. In the case where the previous printer is different from the current printer, the color laser printer 10 obtains setting information on the previous printer, which is stored in a storage element 50 of the toner cartridge 40, and applies the obtained setting information for the current printer. The various settings in the previous printer are thus turned over to the current printer, when the toner cartridge 40 is detached from the previous printer and is attached to the current printer. This arrangement ensures smooth printing operations without requiring any troublesome settings to use the current printer.

10 Claims, 6 Drawing Sheets

| | Cartridge ID | abc123 |
|---|---|---|
| | Product Number of Printer | #123456 |
| Setting Information on Printer | Cassette Paper Size | ..... |
| | Printing Density Level | ..... |
| | Offset Interval | ..... |
| | Communication System | ..... |
| | IP Address | ..... |
| | ..... | ..... |
| Setting Information on Options | Number of Trays | ..... |
| | Double-Sided Printing Unit | ..... |
| | Font Type | ..... |
| | Interface Type | ..... |
| | ..... | ..... |

FIG.6

PRINTER, PRINTER SETTING METHOD AND CORRESPONDING PROGRAM, AND CARTRIDGE

BACKGROUND OF THE INVENTION

1. Field of the Invention

The present invention relates to a printer, a printer setting method and its corresponding program, as well as to a cartridge.

2. Description of the Prior Art

Diverse settings are required at the time of installation of a printer or an option attached to the printer. The settings are used to specify basic prerequisites for the use of the printer and include, for example, a type of PDL (page description language), a print starting position, and a standby time for a shift to a power saving mode. The setting is carried out through operations of an operation panel on the printer or according to a setting application program installed in a personal computer connecting with the printer. In many cases, some expert having specialized knowledge takes charge of such settings at the time of installation of the printer. In the general service conditions and environment, the printer automatically selects the optimum values for the diverse settings. The standard user who actually uses the printer may not have any knowledge of the settings nor be even conscious of the requirement for such settings.

When the user uses a particular application program, the settings of a printer may be appropriate only for the application program. In the case of replacement of the printer, for example, due to a failure of the printer, the standard user may use the replacement or replaced printer without adequate settings. This may result in various troubles, such as malfunction of the replaced printer or an option attached to the printer or printing operations against the user's requirements.

With the business organizations' recent efforts to tackle the environmental problems, less frequently used functions of the printer like the power saving mode and the double-sided printing have been noted for their active use. To make use of these functions, the initial settings of the printer may be forcibly changed to in-company recommended values. In such cases, the change of the settings is essential at each time of replacement of the printer.

SUMMARY OF THE INVENTION

The object of the present invention is thus to improve the drawbacks described above and to provide a printer that ensures smooth printing operations without requiring any troublesome settings when a cartridge used for another printer is attached to, as well as a method of setting such a printer and a corresponding program. The object of the invention is also to provide a cartridge suitable for such a printer.

In order to achieve the above objects, a printer of the present invention includes: a cartridge that has a storage element for storing identification information and setting information on a previous printer, which the cartridge has been attached to immediately before attachment to the current printer; an identification information acquisition module that obtains the identification information on the previous printer, which is stored in the storage element of the cartridge, when the cartridge is attached to the current printer; an identification information storage module that stores identification information on the current printer; an identification information judgment module that determines whether the identification information on the previous printer obtained by the identification information acquisition module is identical with or different from the identification information on the current printer stored in the identification information storage module; and a setting information acceptance module that, when the identification information judgment module determines that the identification information on the previous printer is different from the identification information on the current printer, obtains the setting information on the previous printer, which is stored in the storage element of the cartridge, and applies the obtained setting information for the current printer.

When the previous printer, which the cartridge has been attached to immediately before attachment to the current printer, is different from the current printer, the printer of the invention obtains the setting information on the previous printer, which is stored in the storage element of the cartridge, and applies the obtained setting information for the current printer. The various settings in the previous printer are thus turned over to the current printer, when the cartridge is detached from the previous printer and is attached to the current printer. This arrangement ensures smooth printing operations without requiring any troublesome settings to use the current printer. The determination of whether the current printer is identical with or different from the previous printer is based on the identification information intrinsic to the printers. This arrangement ensures the easy and accurate determination. Here the 'cartridge' represents a member that is detachably attached to the printer and holds a coloring material for printing, such as a toner or ink.

In the printer of the present invention, the storage element of the cartridge may store setting information on a main body of the previous printer and setting information on an option of the previous printer, as the setting information on the previous printer, which the cartridge has been attached to immediately before attachment to the current printer, and the setting information acceptance module, when the identification information judgment module determines that the identification information on the previous printer is different from the identification information on the current printer, may obtain the setting information on the previous printer, which is stored in the storage element of the cartridge, and apply the obtained setting information on the main body of the previous printer without any selection for the current printer, while accepting only a selected piece of setting information on an option attached to the current printer among the obtained setting information on the option of the previous printer.

In the printer of the present invention, after the identification information judgment module determines that the identification information on the previous printer is different from the identification information on the current printer, the setting information acceptance module may apply the setting information on the previous printer, which is stored in the storage element of the cartridge, for the current printer in response to an entry of acceptance of the setting information, while applying initial setting information for the current printer in response to an entry of rejection of the setting information. In this case, the printer of the present invention may further include an entry request module that, when the identification information judgment module determines that the identification information on the previous printer obtained by the identification information acquisition module is different from the identification information on the current printer stored in the identification information storage module, requests an operator to enter acceptance or rejection of applying the setting information on the previous printer, which is stored in the storage element of the cartridge, for the current printer, and the setting information acceptance module, after a request by the entry request module, may apply the setting information on the previous printer, which is stored in the storage element of the cartridge, for the current printer in response to the operator's entry of acceptance of the setting information, while applying initial setting information for the current printer in response to the operator's entry of rejection of the setting information. In another preferable embodiment of the invention, acceptance-rejection information relating to acceptance or rejection of applying the setting information on the previous printer for the current printer is stored in advance in the storage element of the cartridge. Acceptance or rejection of applying the setting information on the previous printer for the current printer may be determined according to the stored acceptance-rejection information.

The printer of the present invention may further include an information writing module that writes the identification information and setting information on the current printer into the storage element of the cartridge.

A printer setting method of the present invention is a method according to computer software, the printer including a cartridge that has a storage element for storing identification information and setting information on a previous printer, which the cartridge has been attached to immediately before attachment to the current printer, and an identification information storage module that stores identification information on the current printer, the printer setting method including the steps of:

(a) obtaining the identification information on the previous printer, which is stored in the storage element of the cartridge, when the cartridge is attached to the current printer;

(b) determining whether the identification information on the previous printer obtained in the step (a) is identical with or different from the identification information on the current printer stored in the identification information storage module; and (c) when it is determined in the step (b) that the identification information on the previous printer is different from the identification information on the current printer, obtaining the setting information on the previous printer, which is stored in the storage element of the cartridge, and applying the obtained setting information for the current printer.

When the previous printer, which the cartridge has been attached to immediately before attachment to the current printer, is different from the current printer, the printer setting method of the invention obtains the setting information on the previous printer, which is stored in the storage element of the cartridge, and applies the obtained setting information for the current printer. The various settings in the previous printer are thus turned over to the current printer, when the cartridge is detached from the previous printer and is attached to the current printer. This arrangement ensures smooth printing operations without requiring any troublesome settings to use the current printer.

A printer setting program of the present invention is a program that causes one or multiple computers mounted on a printer to execute multiple steps, the printer including a cartridge that has a storage element for storing identification information and setting information on a previous printer, which the cartridge has been attached to immediately before attachment to the current printer, and an identification information storage module that stores identification information on the current printer, the multiple steps including:

(a) obtaining the identification information on the previous printer, which is stored in the storage element of the cartridge, when the cartridge is attached to the current printer;

(b) determining whether the identification information on the previous printer obtained in the step (a) is identical with or different from the identification information on the current printer stored in the identification information storage module; and (c) when it is determined in the step (b) that the identification information on the previous printer is different from the identification information on the current printer, obtaining the setting information on the previous printer, which is stored in the storage element of the cartridge, and applying the obtained setting information for the current printer.

When the previous printer, which the cartridge has been attached to immediately before attachment to the current printer, is different from the current printer, the program of the present invention executed by one or multiple computers obtains the setting information on the previous printer, which is stored in the storage element of the cartridge, and applies the obtained setting information for the current printer. The various settings in the previous printer are thus turned over to the current printer, when the cartridge is detached from the previous printer and is attached to the current printer. This arrangement ensures smooth printing operations without requiring any troublesome settings to use the current printer. The printer setting program may be provided in any suitable form, for example, may be recorded in a computer readable recording medium (for example, a hard disk, a ROM, an FD, a CD, or a DVD) or distributed from one computer to another computer via a transmission medium (a communication network like the Internet or a LAN).

The cartridge of the present invention holds a coloring material for printing and has a storage element for storing identification information and setting information on a printer, which the cartridge has just been detached from. This cartridge is suitably used as the constituent of the printer or the printer setting method of the present invention.

DESCRIPTION OF THE PREFERRED EMBODIMENTS

Figure 1:
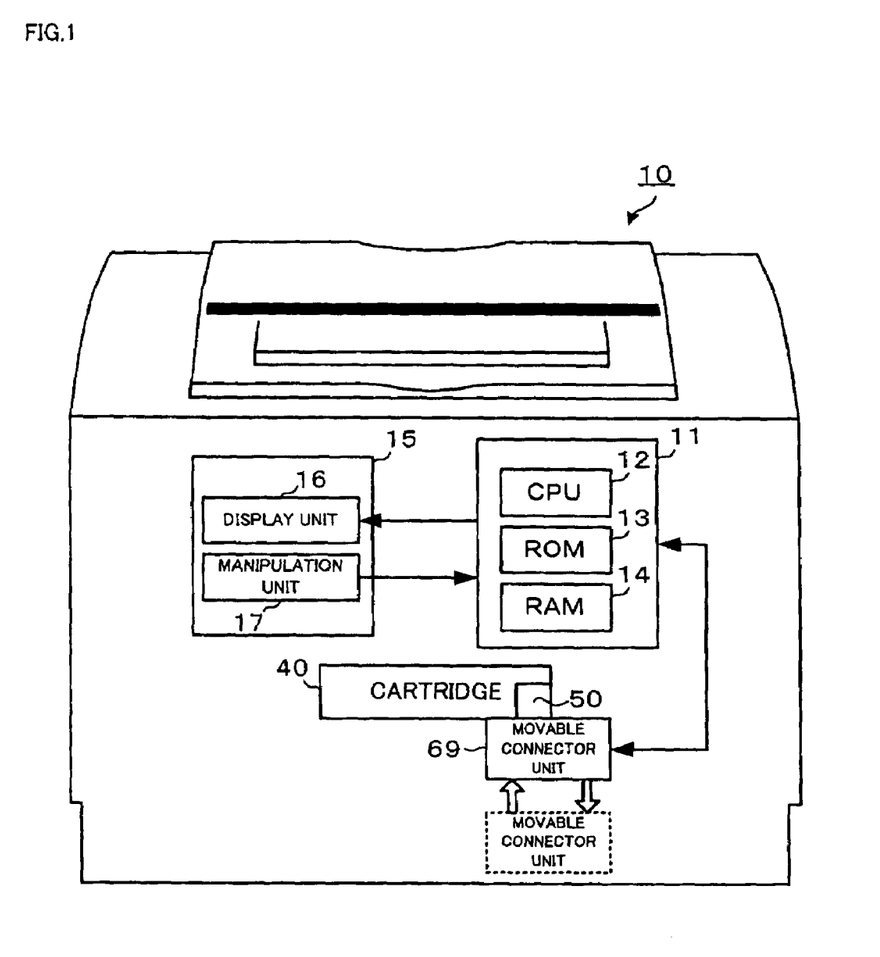
FIG. 1 is a block diagram schematically illustrating the structure of a color laser printer in the embodiment.
Figure 2:
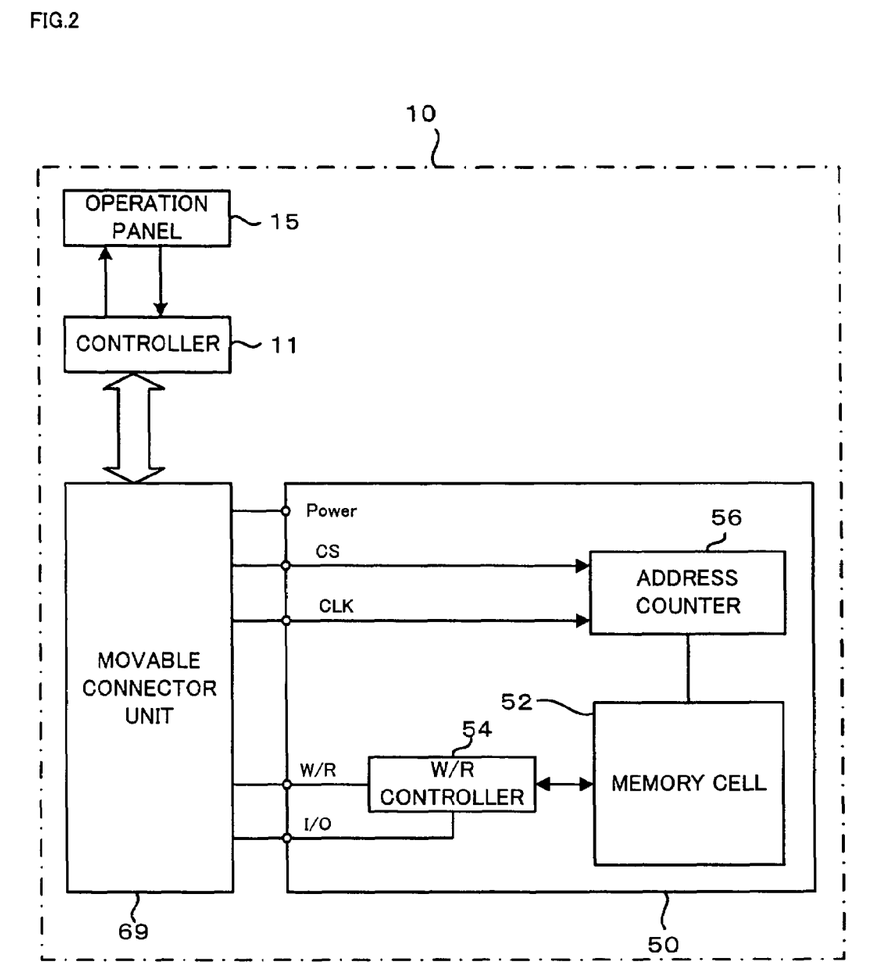
FIG. 2 is a block diagram showing an electric connection including a storage element of a cartridge.

One embodiment of the invention is discussed below with the accompanied drawings. FIG. 1 is a block diagram schematically illustrating the structure of a color laser printer in the embodiment. FIG. 2 is a block diagram showing an electric connection including a storage element of a cartridge. A color laser printer 10 is capable of color printing and functions as the printer of the present invention.

The structure relating to color printing will be discussed later with reference to FIG. 4. Here the structure of the printer is described with reference to FIGS. 1 and 2.

The color laser printer 10 mainly includes a controller 11, an operation panel 15, a movable connector unit 69, and a toner cartridge 40. The controller 11 is constructed by a known computer including a CPU 12, a ROM 13, and a RAM 14. The operation panel 15 has a display unit 16 that shows various pieces of information on a display, and a manipulation unit 17 that is manipulated, for example, by a press of a button or a touch of a panel, to input various pieces of information into the controller 11. The movable connector unit 69 is located either at a position of electrically connecting with a storage element 50 integrated with the toner cartridge 40 or at a position of electrically disconnecting from the storage element 50. When the movable connector unit 69 is located at the position of electrically connecting with the storage element 50, the controller 11 is accessible to the storage element 50 via the movable connector unit 69. The toner cartridge 40 is a member that holds a toner of each color among four colors therein and is integrated with the storage element 50, and is detachably set in the color laser printer 10. As discussed later, there are actually four toner cartridges 40C, 40M, 40Y, and 40K, which correspond to the respective colors and are individually attachable to and detachable from the color laser printer 10. For convenience of explanation, these four toner cartridges are collectively referred to as the toner cartridge 40.

Figure 3:
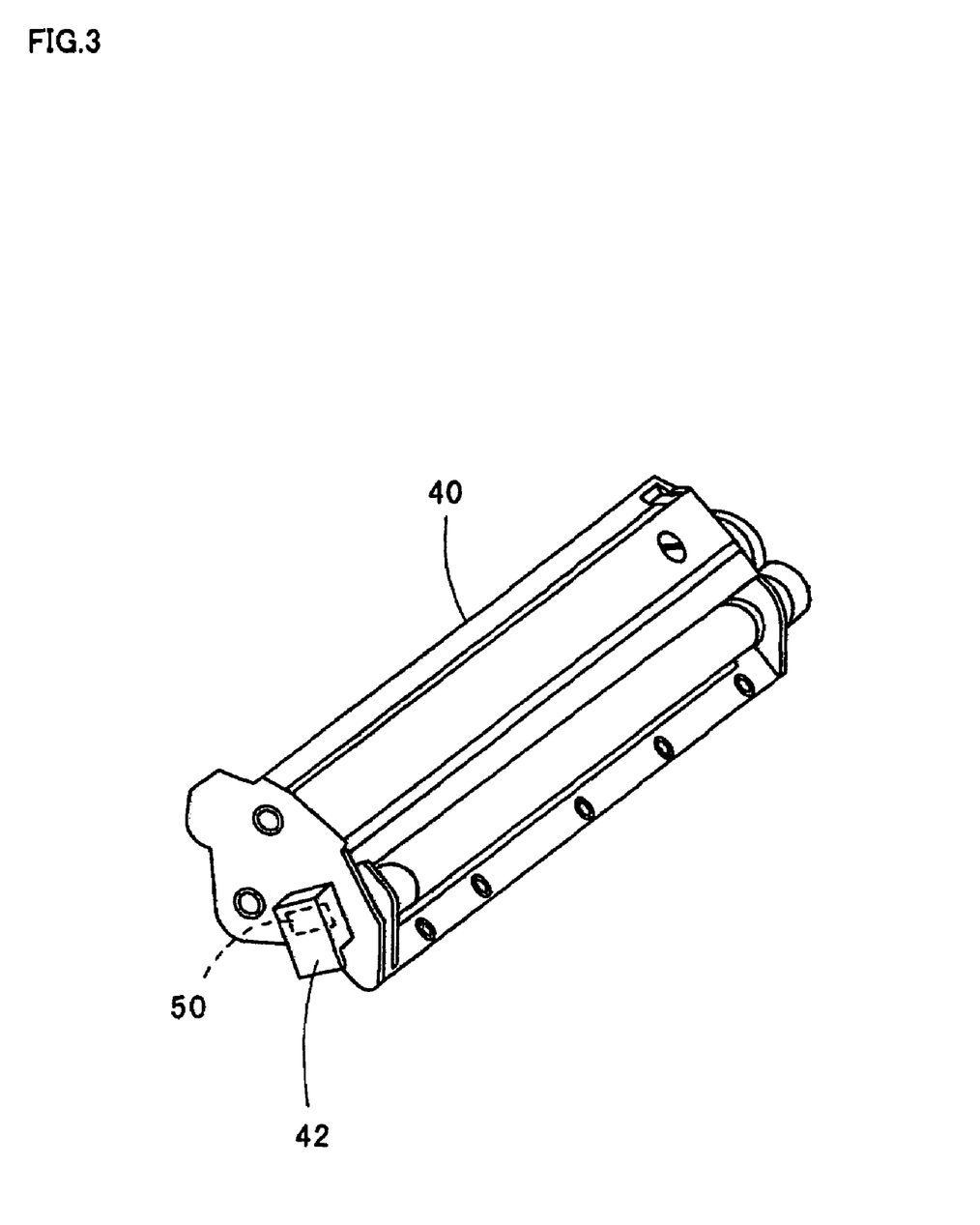
FIG. 3 is a perspective view illustrating the appearance of the toner cartridge.

As shown in FIG. 2, the storage element 50 includes a memory cell 52 that stores data, a read-write controller 54 that controls operations of reading and writing data from and into the memory cell 52, and an address counter 56 that counts up the address in response to a clock signal CLK in the process of data transmission to and from the controller 11 via the read-write controller 54. An EEPROM is one available example of the storage element 50. FIG. 3 is a perspective view illustrating the appearance of the toner cartridge 40. As illustrated, the storage element 50 is incorporated in a holder unit 42 attached to one end of the toner cartridge 40.

Figure 4:
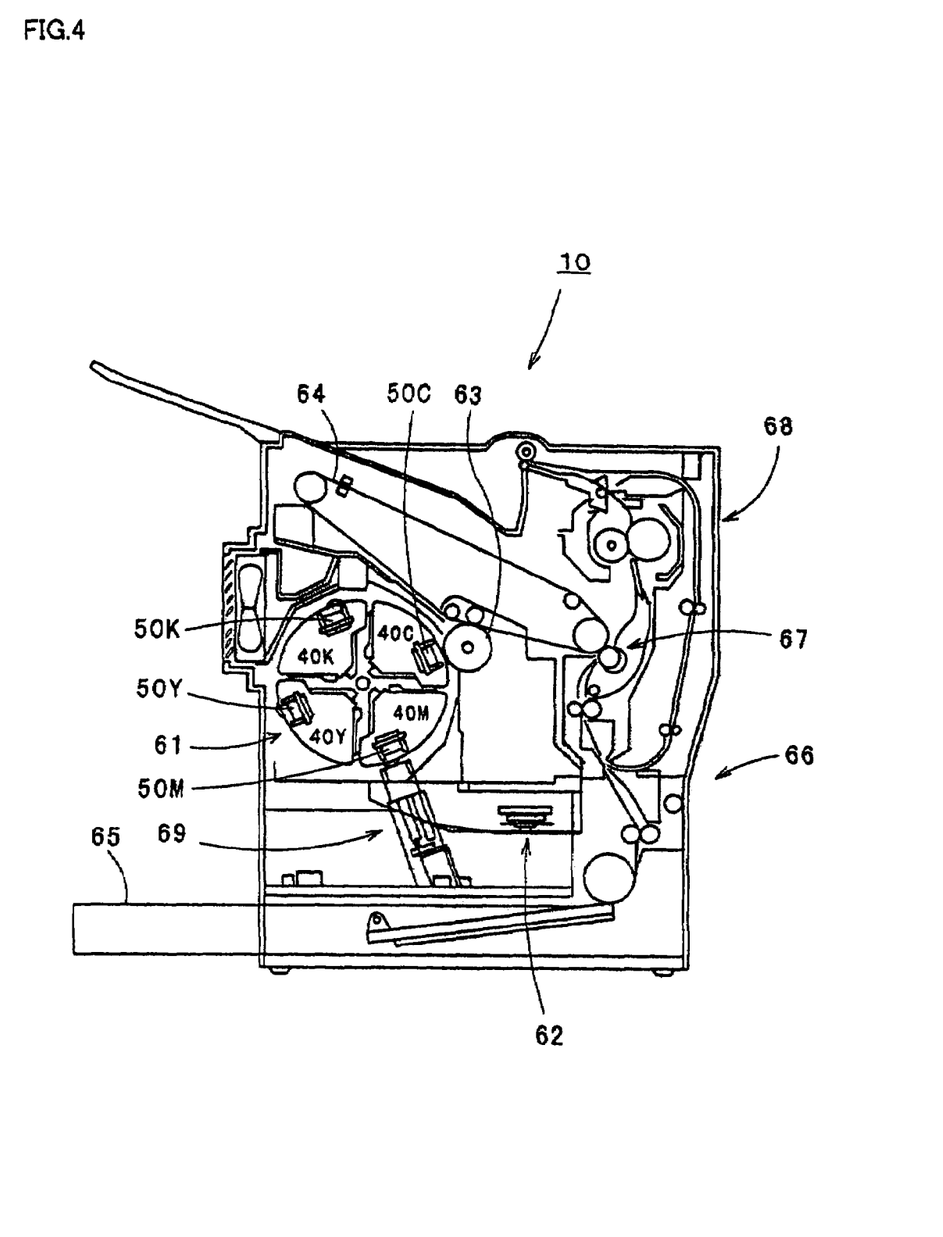
FIG. 4 schematically illustrates the color printing-related structure of the color laser printer with the toner cartridge attached thereto.

FIG. 4 schematically illustrates the color printing-related structure of the color laser printer 10 with the toner cartridge 40 attached thereto. The color laser printer 10 with the toner cartridge 40 attached thereto is constructed as a full-color electrophotographic image formation apparatus adopting a single photoreceptor system and an intermediate transfer system. As shown in FIG. 4, color-separated images of four color components, cyan (C), magenta (M), yellow (Y), and black (K), are formed as electrostatic latent images on a photoreceptor 63 by means of an exposure unit 62 and subsequently formed as toner images corresponding to the electrostatic latent images with toners of the respective four colors supplied from the four toner cartridges 40C, 40M, 40Y, and 40K attached to an image developer unit 61. The four toner images are transferred first in an overlapping manner onto a transfer belt 64 as an intermediate transfer medium. The four overlapping toner images transferred onto the transfer belt 64 are further transferred by a secondary transfer unit 67 onto a sheet of printing paper, which is supplied from a paper cassette 65 and is fed by means of a feeder unit 66. The toner images transferred onto the printing paper are fused and fixed on the printing paper by a fixation unit 68. This forms a resulting color image on the printing paper. The image developer unit 61 is arranged rotatably to make the toner images of the respective colors formed on the photoreceptor 63. The color laser printer 10 also has the movable connector unit 69, which is connected with one of storage elements 50C, 50M, 50Y, and 50K of the respective toner cartridges 40C, 40M, 40Y, and 40K attached to the image developer unit 61, when the storage element 50C, 50M, 50Y, or 50K is located on a lower right side in the drawing. In response to a change of various pieces of setting information relating to the color laser printer 10 and options, the movable connector unit 69 is actuated by the controller 11 to gain connection with each of the storage elements 50C, 50M, 50Y, and 50K and write the setting information into the connected storage element 50C, 50M, 50Y, or 50K. When each of the toner cartridges 40C, 40M, 40Y, and 40K is attached to the image developer unit 61, the movable connector unit 69 is actuated by the controller 11 to gain connection with the corresponding one of the storage elements 50C, 50M, 50Y, and 50K and read the storage contents from the connected storage element 50C, 50M, 50Y, or 50K. The storage contents written in the respective storage elements 50C, 50M, 50Y, and 50K are the identical pieces of setting information relating to the color laser printer 10 and the options. The exposure unit 62 is a known device that makes the photoreceptor 63 exposed to a laser beam scanned by means of a polygon mirror rotated and driven by a motor and thereby forms the electrostatic latent images.

Figure 5:
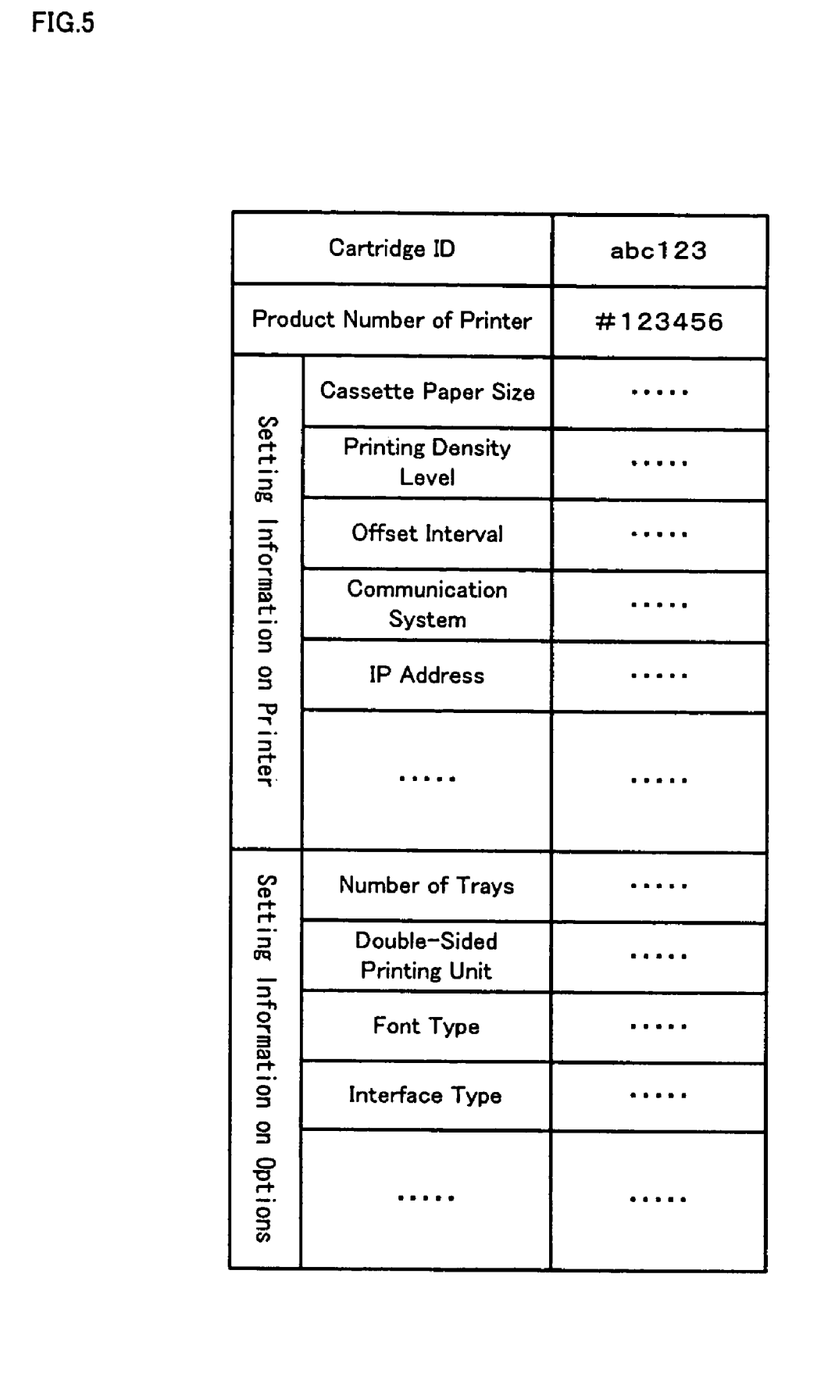
FIG. 5 shows one example of the information stored in the storage element of each toner cartridge.

FIG. 5 shows one example of the information stored in the storage element 50 of each toner cartridge 40. In this embodiment, the storage contents of each storage element 50 include the ID of the corresponding toner cartridge 40 (cartridge ID), the product number (serial number) intrinsic to the color laser printer 10, to which the toner cartridge 40 is attached, various pieces of setting information relating to the color laser printer 10, and various pieces of setting information relating to the options of the color laser printer 10. The various pieces of setting information relating to the color laser printer 10 represent information on the printer main body and include the paper size of the paper cassette set in the printer, the printing density level, the top, bottom, left, and right offset levels, the communication system applied for externally receiving print data, and the address (IP address) used on a network. The various pieces of setting information relating to the options of the color laser printer 10 includes the number of delivery trays used for sorting or another purpose, the presence or the absence of a double-sided printing unit, the font type, and the interface type. Among these pieces of information, the cartridge ID is written in the storage element 50 in the course of manufacturing the toner cartridge 40, for example, at a factory. The product number of the printer is written in the storage element 50, when the toner cartridge 40 is attached to the color laser printer 10. The various pieces of setting information relating to the color laser printer 10 are written into the storage element 50, when the specification is set via the operation panel 15. The various pieces of setting information relating to the options of the color laser printer 10 are written into the storage element 50, when the specification of each option is set via the operation panel 15 after attachment of the option.

Figure 6:
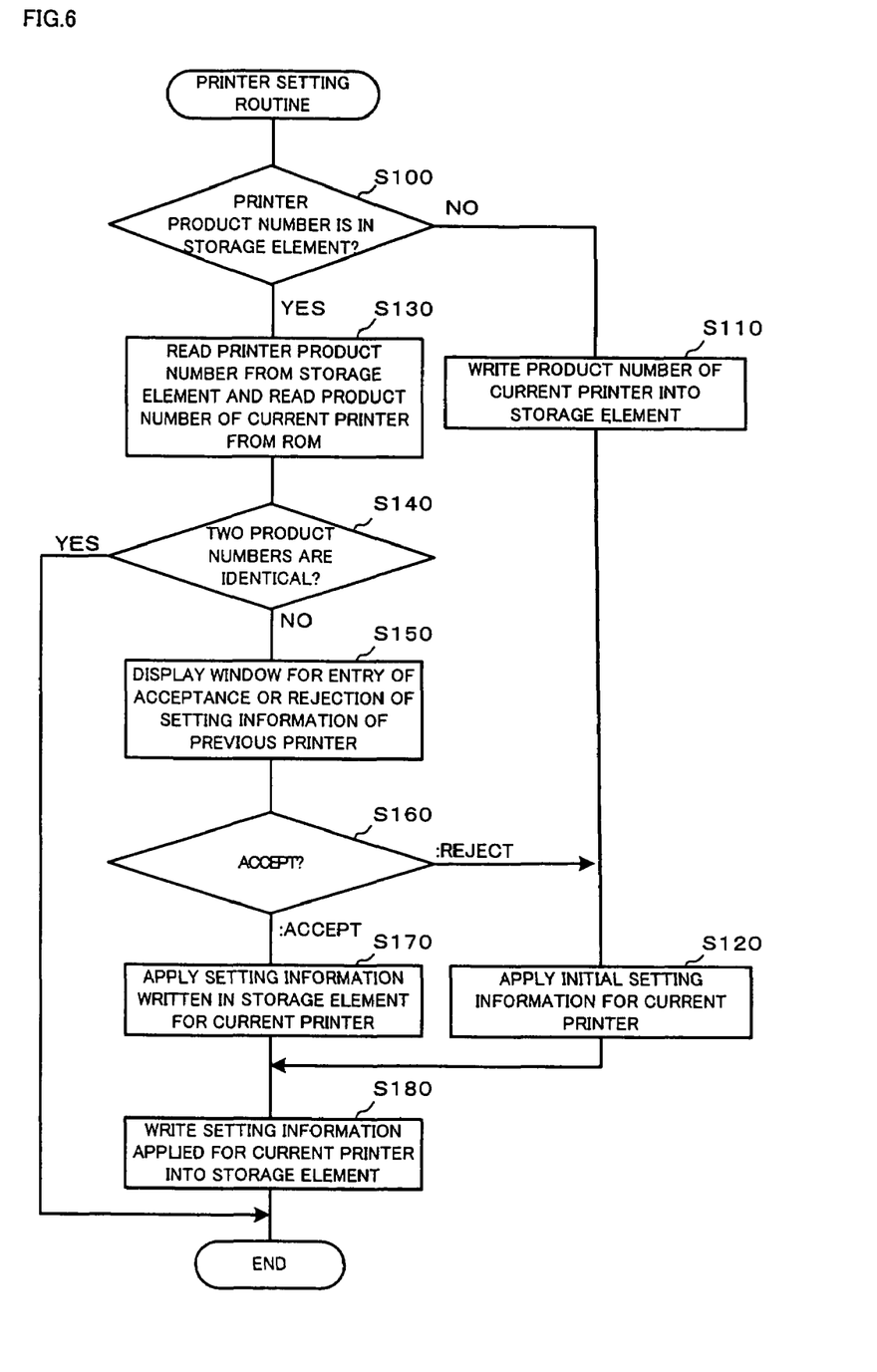
FIG. 6 is a flowchart showing a printer setting routine executed by the controller.

The operations of the color laser printer 10 are discussed below. FIG. 6 is a flowchart showing a printer setting routine executed by the controller 11 when the toner cartridge 40 is set in the color laser printer 10. A program of this printer setting routine, as well as the product number intrinsic to the printer, is stored in the ROM 13 of the controller 11. In the description below, the color laser printer 10, which the toner cartridge 40 is currently attached to, is called the 'current printer'. A printer, which the toner cartridge 40 has been attached to immediately before attachment to the color laser printer 10, is called the 'previous printer'. The storage elements 50C, 50M, 50Y, and 50K of the respective toner cartridges 40C, 40M, 40Y, and 40K shown in FIG. 4 have the same storage contents, except the cartridge IDs. The process discussed below may read the setting information relating to the printer and the options of the printer from any of the storage elements.

When the program enters the printer setting routine, the CPU 12 of the controller 11 first determines whether or not the product number of the previous printer has been written in the storage element 50 of the toner cartridge 40 (step S100). When no product number has been written in the storage element 50, it is determined that the toner cartridge 40 is new. The CPU 12 accordingly reads the product number of the current printer from the ROM 13 and writes the product number of the current printer into the storage element 50 (step S110). The CPU 12 then specifies initial setting information stored in the ROM 13 as the various pieces of setting information relating to the current printer main body and the options of the printer (step S120) and writes the specified pieces of setting information into the storage element 50 (step S180). The program then exits from this printer setting routine.

When the product number of the previous printer has been written in the storage element 50, on the other hand, the CPU 12 reads the written product number of the previous printer and the product number of the current printer stored in the ROM 13 (step S130) and compares the two product numbers with each other (step S140). When the two product numbers are identical with each other, it is determined that the toner cartridge 40 has been detached once from the current color laser printer 10 and has been attached again to the current color laser printer 10, due to some reasons. The current setting information is usable without any change, so that the program immediately exits from this printer setting routine.

When the two product numbers are different from each other, on the contrary, it is determined that the toner cartridge 40 has been attached to the current printer, which is different from the previous printer. The CPU 12 then shows a window, which requests the operator to enter either acceptance or rejection of the various pieces of setting information relating to the previous printer main body and the options of the previous printer for the current printer, on the display unit 16 of the operation panel 15 (step S150). The operator reads the details of the window on the display unit 16 and enters either acceptance or rejection via the manipulation unit 17 of the operation panel 15. The controller 11 specifies the entry of either the acceptance or the rejection (step S160). In the case where the operator enters the 'rejection', the CPU 12 specifies initial setting information stored in the ROM 13 as the various pieces of setting information relating to the current printer main body and the options of the current printer (step S120), and writes the specified pieces of setting information into the storage element 50 (step S180). The program then exits from this printer setting routine. In the case where the operator enters the 'acceptance', on the other hand, the CPU 12 reads the various pieces of setting information relating to the previous printer main body and the options of the previous printer from the storage element 50. Out of the read-out pieces of setting information, the CPU 12 applies the setting information relating to the previous printer main body without any selection for the current printer, while accepting only selected pieces of setting information regarding the options attached to the current printer among the setting information relating to the options of the previous printer (step S170). The CPU 12 writes the accepted pieces of setting information into the storage element 50 (step S180). The program then exits from this printer setting routine.

The components of this embodiment are mapped to the components of the present invention as follows. The controller of this embodiment corresponds to the identification information acquisition module, the identification information judgment module, the setting information acceptance module, and the entry request module of the present invention. The embodiment regards the color laser printer 10. This shows one example of the printer of the invention, as well as examples of the printer setting method and the printer setting program of the invention.

As described above, when the current printer is different from the previous printer, the color laser printer 10 obtains the setting information of the previous printer stored in the storage element 50 of the toner cartridge 40 and accepts the obtained setting information for the current printer 10. In the case where the toner cartridge 40 has been detached from one printer and attached to another printer, the various settings of the previous printer main body and its options are turned over to another printer. This arrangement ensures smooth printing operations without requiring any troublesome settings for another printer. The comparison between the previous printer and the current printer for the purpose of identification is based on the product numbers of the respective printers, which are the identification information intrinsic to the printers. This ensures easy and accurate identification. The operator can determine whether the respective pieces of setting information on the previous printer are accepted or rejected for the current printer. This arrangement effectively prevents the non-required succession of the existing pieces of setting information.

The above embodiment is to be considered in all aspects as illustrative and not restrictive. There may be many modifications, changes, and alterations without departing from the scope or spirit of the main characteristics of the present invention.

In the embodiment discussed above, the arrangement of the printer of the invention is applied to the color laser printer 10 constructed as the full-color electrophotographic image formation apparatus adopting the single photoreceptor system and the intermediate transfer system. The arrangement of the invention may also be applicable to color laser printers and copying machines constructed as full-color electrophotographic image formation apparatuses adopting a multiple photoreceptors system or a direct transfer system. Other possible applications include laser printers and copying machines constructed as monochrome electrophotographic image formation apparatuses, as well as ink-jet color printers and copying machine, which ink cartridges having a storage element similar to the storage element 50 of the embodiment are attached to.

In the embodiment discussed above, the technique of the invention is applied to the color laser printer 10. In one possible modification, an external computer connected to the color laser printer 10 may alternatively execute the printer setting routine of FIG. 6. In one concrete example, the external computer is connected with the movable connector unit 69 and the controller 11. The display unit 16 and the manipulation unit 17 may be replaced by a display and a keyboard connected to the external computer.

What is claimed is:

1. A printer that carries out printing on a printing medium, said printer comprising:
   a cartridge that has a storage element for storing identification information and setting information on a previous printer, which said cartridge has been attached to immediately before attachment to said current printer;

an identification information acquisition module that obtains the identification information on said previous printer, which is stored in the storage element of said cartridge, when said cartridge is attached to said current printer;

an identification information storage module that stores identification information on said current printer;

an identification information judgment module that determines whether the identification information on said previous printer obtained by said identification information acquisition module is identical with or different from the identification information on said current printer stored in said identification information storage module; and a setting information acceptance module that, when said identification information judgment module determines that the identification information on said previous printer is different from the identification' information on said current printer, obtains the setting information on said previous printer, which is stored in the storage element of said cartridge, and applies the obtained setting information for said current printer.

2. A printer in accordance with claim 1, wherein the storage element of said cartridge stores setting information on a main body of said previous printer and setting information on an option of said previous printer, as the setting information on said previous printer, which said cartridge has been attached to immediately before attachment to said current printer, and said setting information acceptance module, when said identification information judgment module determines that the identification information on said previous printer is different from the identification information on said current printer, obtains the setting information on said previous printer, which is stored in the storage element of said cartridge, and applies the obtained setting information on the main body of said previous printer without any selection for said current printer, while accepting only a selected piece of setting information on an option attached to said current printer among the obtained setting information on the option of said previous printer.

3. A printer in accordance with claim 1, wherein after said identification information judgment module determines that the identification information on said previous printer is different from the identification information on said current printer, said setting information acceptance module applies the setting information on said previous printer, which is stored in the storage element of said cartridge, for said current printer in response to an entry of acceptance of the setting information, while applying initial setting information for said current printer in response to an entry of rejection of the setting information.

4. A printer in accordance with claim 3, said printer further comprising:

an entry request module that, when said identification information judgment module determines that the identification information on said previous printer obtained by said identification information acquisition module is different from the identification information on said current printer stored in said identification information storage module, requests an operator to enter acceptance or rejection of applying the setting information on said previous printer, which is stored in the storage element of said cartridge, for said current printer, wherein said setting information acceptance module, after a request by said entry request module, applies the setting information on said previous printer, which is stored in the storage element of said cartridge, for said current printer in response to the operator's entry of acceptance of the setting information, while applying initial setting information for said current printer in response to the operator's entry of rejection of the setting information.

5. A printer in accordance with claim 1, said printer further comprising:

an information writing module that writes the identification information and setting information on said current printer into the storage element of said cartridge.

6. A printer setting method according to computer software, said printer comprising a cartridge that has a storage element for storing identification information and setting information on a previous printer, which said cartridge has been attached to immediately before attachment to said current printer, and an identification information storage module that stores identification information on said current printer, said printer setting method comprising the step of:

(a) obtaining the identification information on said previous printer, which is stored in the storage element of said cartridge, when said cartridge is attached to said current printer;

(b) determining whether the identification information on said previous printer obtained in said step (a) is identical with or different from the identification information on said current printer stored in said identification information storage module; and (c) when it is determined in said step (b) that the identification information on said previous printer is different from the identification information on said current printer, obtaining the setting information on said previous printer, which is stored in the storage element of said cartridge, and applying the obtained setting information for said current printer.

7. A printer setting method in accordance with claim 6, wherein the storage element of said cartridge stores setting information on a main body of said previous printer and setting information on an option of said previous printer, as the setting information on said previous printer, which said cartridge has been attached to immediately before attachment to said current printer, and when it is determined in said step (b) that the identification information on said previous printer is different from the identification information on said current printer, said step (c) obtains the setting information on said previous printer, which is stored in the storage element of said cartridge, and applies the obtained setting information on the main body of said previous printer without any selection for said current printer, while accepting only a selected piece of setting information on an option attached to said current printer among the obtained setting information on the option of said previous printer.

8. A printer setting method in accordance with claim 6, wherein after it is determined in said step (b) that the identification information on said previous printer is different from the identification information on said current printer, said step (c) applies the setting information on said previous printer, which is stored in the storage element of said cartridge, for said current printer in response to an entry of acceptance of the setting information, while applying initial setting information for said current printer in response to an entry of rejection of the setting information.

9. A printer setting method in accordance with claim 8, wherein after determining that the identification information on said previous printer is different from the identification information on said current printer stored in said identification information storage module, said step (b) requests an operator to enter acceptance or rejection of applying the setting information on said previous printer, which is stored in the storage element of said cartridge, for said current printer, and     after requesting the operator to enter acceptance or rejection of applying the setting information on said previous printer for said current printer, said step (c) applies the setting information on said previous printer, which is stored in the storage element of said cartridge, for said current printer in response to the operator's entry of acceptance of the setting information, while applying initial setting information for said current printer in response to the operator's entry of rejection of the setting information.

10. A printer setting method in accordance with claim 6, said method further comprising the step of:

(d) writing the identification information and setting information on said current printer into the storage element of said cartridge, after said step (c).

\* \* \* \* \*